(12) United States Patent
Tiemeyer et al.

(10) Patent No.: US 10,794,431 B2
(45) Date of Patent: Oct. 6, 2020

(54) CLUTCH ACTUATION MECHANISM

(71) Applicant: HELLA GMBH & CO. KGAA, Lippstadt (DE)

(72) Inventors: Sebastian Tiemeyer, Dortmund (DE); Hagen Mueller, Bad Wuennenberg-Fuerstenberg (DE); Frank Bewermeyer, Bueren (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 137 days.

(21) Appl. No.: 16/155,253

(22) Filed: Oct. 9, 2018

(65) Prior Publication Data

US 2019/0040918 A1  Feb. 7, 2019

Related U.S. Application Data

(63) Continuation of application No. PCT/EP2017/057955, filed on Apr. 4, 2017.

(30) Foreign Application Priority Data

Apr. 8, 2016 (EP) .................................. 16164473

(51) Int. Cl.
*F16D 23/14* (2006.01)
*F16D 23/12* (2006.01)
(Continued)

(52) U.S. Cl.
CPC ......... *F16D 23/146* (2013.01); *F16D 13/752* (2013.01); *F16D 23/12* (2013.01);
(Continued)

(58) Field of Classification Search
None
See application file for complete search history.

(56) References Cited

U.S. PATENT DOCUMENTS 4,878,396 A    11/1989  Grunberg
5,135,090 A  *  8/1992  Bertin ...................... F16D 28/00
                                                           192/82 P

FOREIGN PATENT DOCUMENTS

DE        3502341 A1    7/1985
DE        1970365 C2   11/1997
(Continued)

OTHER PUBLICATIONS

International Search Report dated Jun. 30, 2017 in corresponding application PCT/EP2017/057955.
(Continued)

*Primary Examiner* — Mark A Manley
(74) *Attorney, Agent, or Firm* — Muncy, Geissler, Olds & Lowe, P.C.

(57) ABSTRACT

A clutch actuation mechanism for actuating a clutch operator of a spring loaded friction clutch having at least a motor driven rotary disc for being connected to the clutch operator enables to operate the motor with an essentially constant and reduced torque, if a pin is attached to the disc with an offset from the disc's rotary axis, and if a lever has a curved contacting surface and if a spring forces the lever with its contacting surface against the pin to thereby provide an additional torque to the disc. Thus, the pin travels over the contacting surface when the disc rotates to open or close the spring loaded clutch via the clutch operator and the curvature enables to adapt the torque provided by the spring to the torque required to compensate for the clutch spring.

14 Claims, 2 Drawing Sheets

(51) Int. Cl.
*F16D 13/75* (2006.01)
*F16D 27/112* (2006.01)
*F16D 28/00* (2006.01)

(52) U.S. Cl.
CPC ............ *F16D 27/112* (2013.01); *F16D 28/00* (2013.01); *F16D 2023/123* (2013.01); *F16D 2023/126* (2013.01); *F16D 2300/18* (2013.01)

(56) References Cited

FOREIGN PATENT DOCUMENTS

| EP | 3023665 | * | 11/2015 |
| GB | 2117076 A | | 10/1983 |

OTHER PUBLICATIONS

European Search Report dated Oct. 5, 2016 in corresponding application 16164473.7.

* cited by examiner

CLUTCH ACTUATION MECHANISM

This nonprovisional application is a continuation of International Application No. PCT/EP2017/057955, which was filed on Apr. 4, 2017 and which claims priority to European Patent Application No. 16164473.7, which was filed on Apr. 8, 2016 and which are both herein incorporated by reference.

BACKGROUND OF THE INVENTION

Field of the Invention

The present invention relates to a clutch actuation mechanism for actuating a clutch operator of a spring loaded friction clutch. The clutch actuation mechanism has a motor driven rotary disc for being connected to the clutch operator to actuate the clutch operator by a rotation of the disc around a disc's rotary axis.

Description of the Background Art

A clutch is a device for selectively coupling an input shaft with an output shaft, i.e. to engage or disengage transmission of torque and thus power between the input shaft and the output shaft. One as well uses the terminology to close (engage) or open (disengage) a clutch. In the closed state, the input shaft and the output shaft are coupled in a torque transmitting manner (i.e. the clutch transmits any torque being below its maximum specified torque). In the open state, the shafts are decoupled and torque transmission between the two shafts does not take place. In other words, the input shaft and the output shaft of the clutch can rotate independently of each other. In between of these two states, a friction clutch may slip, this means that the clutch may transmit only a fraction of the torque being delivered to the input shaft to the output shaft. Slipping enables, e.g. to couple the two shafts smoothly if they rotate with different rotational speed.

In particular in automotive applications, friction clutches enable to connect or disconnect the engine output shaft (usually the crank shaft) with the transmission gear input shaft. These friction clutches typically have a clutch disk (or a differently shaped clutch device) being connected to one of the two shafts (mostly to a clutch input shaft, often being at the same time the engine output shaft) in a torque transmitting manner. The clutch disc is axially movable by means of a clutch operator (e.g. a clutch lever, a push rod, a pull rod, a Bowden cable or the like) and a clutch spring loads the clutch disk towards a driver. Said driver is torque transmittingly connected to the second of said shafts, typically the transmission gear input shaft (=clutch output shaft). The driver is commonly called clutch bell, and we will use the terms interchangeably. Due to the friction between the clutch disc and the clutch bell a torque can be transmitted between the first and second shaft. A clutch operator like e.g. clutch lever is connected to the clutch disc enabling to move the clutch disc away from the clutch bell, thereby opening the clutch, i.e. disconnecting the two shafts. If one releases the lever (the clutch operator), the spring pushes the clutch against the clutch bell and the two shafts are torque transmittingly connected. The clutch operator is typically mechanically connected with a clutch pedal, enabling a driver to actuate the clutch lever with one of his feet, typically using the left feet.

In drive by wire applications the clutch pedal is not mechanically coupled to the clutch operator, instead the clutch operator has to be actuated by a motor in response to a sensor's signal, e.g. a clutch pedal deflection sensor. In principle this is easy, but a problem in driving the clutch lever is that its force versus deflection curve is not linear and has a pronounced maximum in between of the positions where clutch engages and disengages, respectively. Beyond, the force being required to open a clutch can be significant and is often in the range of a few kN.

It has been suggested in DE 197 10 365 C2 to actuate a clutch with an electric motor, driving a worm drive via a friction clutch. The threaded spindle of the worm drive engages with a gear wheel. The gear wheel is connected to a rotary cam with a pin being offset from the rotational axis of the gear wheel. The pin engages with a push rod for actuating a clutch disc. Thus, depending on the direction of rotation of the electric motor, the push rod can be advanced or retracted. To reduce the torque required to rotate the threaded spindle, a spring is coupled with the rotary cam to store potential energy when closing the clutch. This potential energy is used to support the motor when opening the clutch at a later point of time.

DE 3502341 A suggests a control mechanism for an automotive clutch. The clutch is actuated by pivoting a release lever. The release lever has two arms, one at each side of a pivoting bearing supporting the release lever relative to a housing. The drive for pivoting the release lever comprises a second lever, being pivotably supported relative to the housing and engaging with a pin into a radial slot in the second arm release of the release lever. The distal end of the second lever has teeth into which a motor driven gear engages.

GB 2 117 076 A, which corresponds to U.S. Pat. No. 4,878,396, as well suggests a control mechanism for an automotive clutch with a release lever. Two springs are connected to the release lever to preload the lever depending on its position. The superposition of the spring loads shall compensate for the clutch spring, thereby enabling a comparatively small electric motor to engage and disengage the clutch.

SUMMARY OF THE INVENTION

It is therefore an objection if the invention is to provide a simple and reliable clutch actuation mechanism.

In an exemplary embodiment, the clutch actuation mechanism for actuating a clutch operator of a spring loaded friction clutch comprises at least a rotary disc for being connected to the clutch operator. The connection can be provided e.g. by push rod being pivoting connected to the disc and to the clutch operator. Other types of connecting the disc with the clutch operator can be used as well, e.g. a Bowden cable, a hydraulic actuator or the like. For example the disc may provide a cam (or being connected to a cam disc or cam shaft) for pushing a clutch operator against the force being provided by the clutch spring. The disc does not need to be a full disc, it can as well be a disc segment to thereby reduce the weight and the size of the clutch actuation mechanism.

As indicated above, the disc can be a rotary disc. This means it can be rotatably supported to enable a rotation of the disc around a disc's rotary axis, e.g. by a radial bearing. A motor is coupled to drive the rotation of the disc, in other words the motor may provide a first torque $M_m$ to the disc, contributing to a rotation of the disc.

The disc comprises a pin being attached to the disc with an offset r from the disc's rotary axis. If the disc rotates, the pin provides a circular path with a radius r. Accordingly, the disc's rotary axis and the pin define a vector from the rotary axis to the pin is referred to as r (r is used to indicate the corresponding scalar, i.e. the length of the vector).

A lever is pivoting supported to pivot around a lever's pivot axis. The pivot axis and the disc's rotary axis are at least essentially parallel)(±5°). The lever has a contacting surface being pushed against the pin, to thereby provide a second torque to the disc. To this end, a spring forces the lever with its contacting surface against the pin. As the disc rotates to open and close the spring loaded clutch via the clutch operator, the pin travels over the contacting surface. The lever arm $d_l$ of the lever transmitting the spring force via the pin to the disc, thus changes during the rotation and enables to adapt the additional torque being provided to the disc to compensate at least in part for the non-constant force being required to actuate the clutch via the clutch operator. Thus, the torque required to be provided by the motor can be kept low and almost constant. This enables to reduce the power required by the motor and as well the motor's weight. In addition, the transmission coupling the motor to the disc can be lighter (and thus cheaper) as well. In the simplest case, the motor shaft has a pinion engaging to gear teeth of the disc, but other more complex transmissions may be used as well.

In an embodiment, the contacting surface is curved. This enables to even better adapt the torque $M_l$ provided via the lever to disc to the torque required to operate the clutch operator. As the pin contacts the contacting surface at a varying position this defines a so called 'first tangent' of the contacting surface, or in other words the first tangent is the tangent of the contacting surface at the position where contacting surface contacts the pin. A 'second tangent' is defined by the traveling path of the pin, again at the position where the pin contacts contacting surface. These two tangents intersect at an angle δ at the point where the pin contacts the contacting surface (if the pin's diameter is neglected). In a particular preferred embodiment, the contacting surface has a section, where the angle δ follows the following equation:

$$\delta = \text{Arcsin}\left(\frac{-M_C(\varphi)\sqrt{r^2\sin^2(\varphi) + (d_{min} + r(1-\cos(\varphi)))^2}}{r(F_0 + k\cdot\Delta l)d_S}\right) \pm \Delta\delta,$$

Here $M_C(\varphi)$ (briefly $M_C$) is the torque (±20%, preferably ±10%, or even more preferred ±5% or even less) required to compensate the clutch spring as a function of φ. φ is the angle between the radial direction being defined by the pin's center and the ray starting at the rotary axis through the pivot axis. $d_{min}$ is the minimum distance between the pin's center and the pivot axis, i.e. the distance between the pin's center and the pivot axis, if $\vec{r}$ points to the pivot axis (angle between $\vec{r}(\varphi)$ and $\tau(\varphi=0)$). Δδ is an boundary that should be kept low, e.g. Δδ≤10°, preferably Δδ≤5°, even more preferred Δδ≤1°.

$\vec{F_0}$ is the force provided by the spring to the lever at a lever arm $\vec{d_S}$ from the pivot axis (as usual the length of vector will be represented by omitting the arrow), $\vec{k}$ is the spring's constant and $\Delta \vec{l}$ the extension of the spring relative to the length $l_0$, where the spring provides $\vec{F_0}$. Only for simplicity, $\vec{F_0}$, $\vec{k}$ and Δl should be at least approximately parallel (±10°) and at least approximately orthogonal (±10°) to $\vec{d_S}$. Deviations from the orthogonality can be compensated by replacing $(F_0+k\cdot\Delta l) d_S$ by $(F_0+k\cdot\Delta l) d_S \sin\gamma$, wherein γ is the angle between the force $\vec{F_S}$ provided by the spring and the lever arm $\vec{d_S}$. In this case the restriction for orthogonality can be waived and δ reads:

$$\delta = \text{Arcsin}\left(\frac{-M_C\sqrt{r^2\sin^2(\varphi) + (d_{min} + r(1-\cos(\varphi)))^2}}{r(F_0 + k\cdot\Delta l)\cdot d_S \cdot \sin(\gamma)}\right) \pm \Delta\delta,$$

In an embodiment, the pin is rotatably supported by the disc, this reduces friction and thus the response of the clutch to controls provided to the motor (e.g. via a control unit) is more direct as breakaway torque is reduced.

The clutch actuation can comprise a support structure supporting at least the (radial) bearing of the disc, the pivotable support mechanism of the lever and the motor. The constraining forces are thus as far as possible adsorbed the support structure. The support structure may be attached to the clutch housing, a clutch support or the like, to thereby provide a closed linkage of the components.

The motor can be an electro motor being coupled to the disc via a reduction gear.

For example, if the contacting surface has a first segment where the angle δ is zero (±5°), the motor's torque is not amplified by the spring, this is advantageous e.g. at angles φ at which $M_C(\varphi)$ is rather low or essentially vanishes (i.e. $M_C(\varphi)$). Rather low means here that $$M_C(\varphi) \leq \frac{1}{3}\text{Max}(M_C),$$

for example:

$$M_C(\varphi) \leq \frac{1}{10}\text{Max}(M_C),$$

wherein $\text{Max}(M_C(\varphi))$ is the maximum of $M_C$ to compensate for the clutch spring.

In an example, δ is selected to overcompensate the torque required to compensate the clutch spring, if the clutch operator are in a position where the clutch is open and/or closed. This enables to shut the motor in the respective end positions off and the corresponding end position (clutch open or closed) is maintained. In other words, the clutch actuation mechanism renders the clutch bistable. No energy is wasted to maintain the clutch open or closed, respectively. Selecting δ as suggested is simple, simply replace $M_C(\varphi_{open})$ and/or $M_C(\varphi_{closed})$ by a slightly bigger (neglecting a potential sign) value for the angles $\varphi_{open}$ or $\varphi_{closed}$ which correspond to the open or closed position, respectively. In 'pseudo C' this can be expressed as $M_C(\varphi_{open})$: $=c_o \cdot M_C(\varphi_{open})$ $M_C(\varphi_{closed})$: $=c_c \cdot M_C(\varphi_{closed})$, wherein $c_o$ and $c_c$ are larger than 1, e.g. 1.1, or 1.2.

In principle, the disc could be reduced to a lever being rotatably supported. But the term clever is required for another item of the clutch actuation mechanism being distinct from the disc. The term 'disc' has been chosen only to enhance readability. One could as well replace the term disc by 'first lever' and the term lever by 'second lever'.

The pin can be rotatably supported relative to the rotary disc, e.g. by a radial bearing. The radial bearing may be a plain bearing, a ball bearing, a needle bearing, a magnetic bearing, a hydrostatic bearing or the like. Alternatively, the pin may preferably comprise a core being attached to the rotary disc. The core may support a radial bearing, wherein the radial bearing comprises or supports a ring or a ring segment being in contact with the lever's contact surface. Thus, when driving the rotary disc, the ring (segment) travels over the lever's contact surface.

The lever's contacting surface may have number of adjacent first protrusions with first recesses in between. The pin may in turn have a number of adjacent second protrusions with second recesses in between, wherein at least one of the first protrusions engage/s into at least one of the second recesses and at least one of the second protrusions engage/s into at least one the first recesses. The engagement of the protrusions with their complementary recesses ensures, that the pin rotates while traveling over the lever's contacting surface. This rotation enhances the lifecycle of clutch actuation mechanism and reduces manufacturing costs. One reason is that it reduces wear of the lever and the pin. Further the initial breakaway torque is reduced, thus the motor for driving the rotary disc (and the corresponding transmission) can be dimensioned smaller, reducing costs, weight and energy consumption.

For example, the above mentioned radial bearing may support a ring having the second protrusions and the second recesses.

For example, the ring may be a gear wheel, being rotatably supported relative to the rotary disc by at least one radial bearing. In other words, the pin may comprise a gear wheel being rotatably supported relative to the rotary disc. The lever may thus be a teethed rack. As explained above in more detail, the rack may be curved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
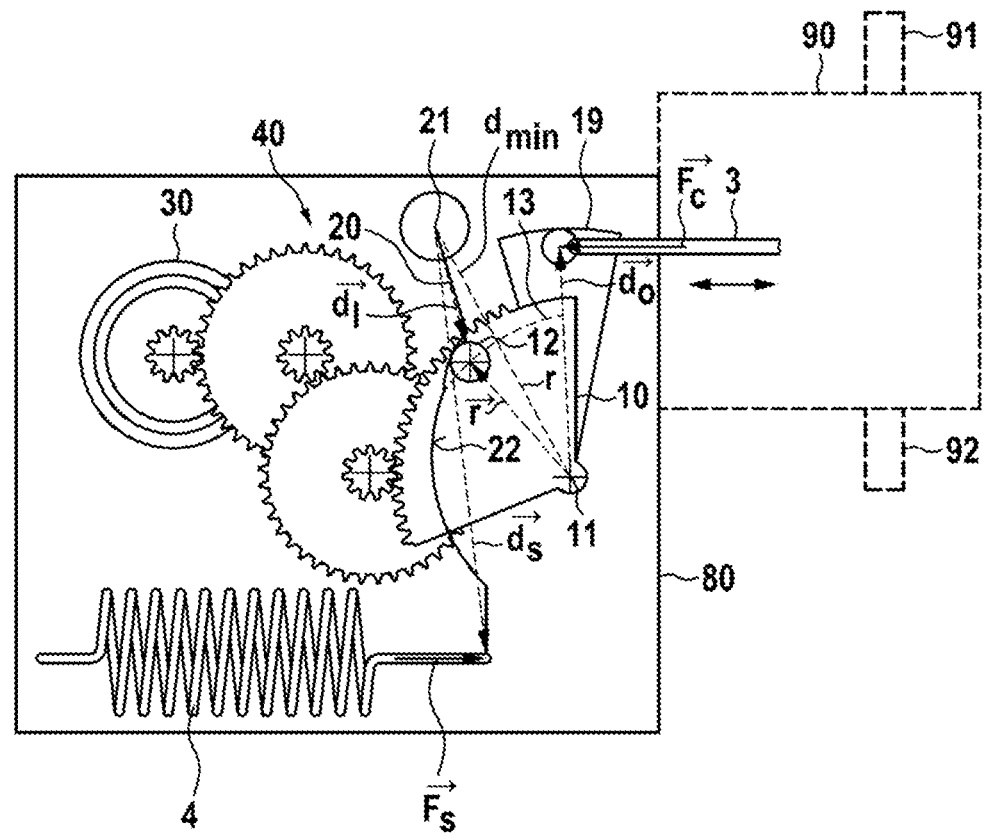
FIG. 1 shows an example of a clutch actuation mechanism.

In FIG. 1 an exemplary embodiment of a clutch actuation mechanism is shown. The clutch operating mechanism has a support 80, being symbolized by a frame. The support 80 supports a motor 30 driving a disc 10 via a symbolized reduction gear 40. The motor 30 could as well drive the disc 10 via a shaft or directly, but the reduction gear 40 is a preferred alternative. The motor is preferably an electric motor.

Only for completeness, it is noted that the disc 10 is rotatably supported relative to the support, enabling a rotation of the disc 10 around its rotary axis 11. In the depicted example, the disc 10 is represented by a disc segment 10 with a disc extension 19. The disc extension 19 and the disc 10 can be made of a single piece, i.e. form a unitary piece. A clutch operator 3, here in the form of a push rod is connected to the disc 10 at a distance $d_o$, thus the lever arm is $\vec{d}_0$. Advancing or retracting the clutch operator 3 enables to open or close the clutch 90. The clutch operator 3 transmits a force $\vec{F}_C$ required to open the clutch.

As usual, the clutch 90 has an input shaft 91 and an output shaft 92 which can be connected enabling a torque transmission between said two shafts 91, 92. Spring loaded friction clutches 90 are known in the prior art and thus it is symbolized by a dashed box, only. To summarize: a rotation of the motor 30 is transmitted via the reduction gear into a rotation of the disc 10, and thus in principle enables to advance or retract the clutch operator 3, if the torque provided by the motor via the reduction gear is sufficient to compensate the force $\vec{F}_C$ or more precisely the torque $\vec{M}_C = \vec{F}_C \times \vec{d}_0$.

To keep the motor torque low, an additional torque is provided by a spring 4 via a lever 20. The lever 20 is pivotable supported by the support 80. The lever's pivot axis 21 is at least essentially parallel (±5°) to the rotary axis 11 of the disc 10. The spring 4 presses a curved contacting surface 22 of the lever 20 against a pin 12 being connected to the disc 10 at distance r from the rotary axis 11. Thus the lever 20 provides an additional torque $\vec{M}_l$ to the disc, thereby supporting the motor 30. The additional torque $\vec{M}_l$ provided to the disc 10 depends on the force $\vec{F}_S$ provided by the spring to the lever 20 at the lever arm $\vec{d}_S$, the angle of attack of the lever 20 to the pin 12 and the lever arm $\vec{d}_l$ of the lever 20 relative to the pin 12.

Figure 2:
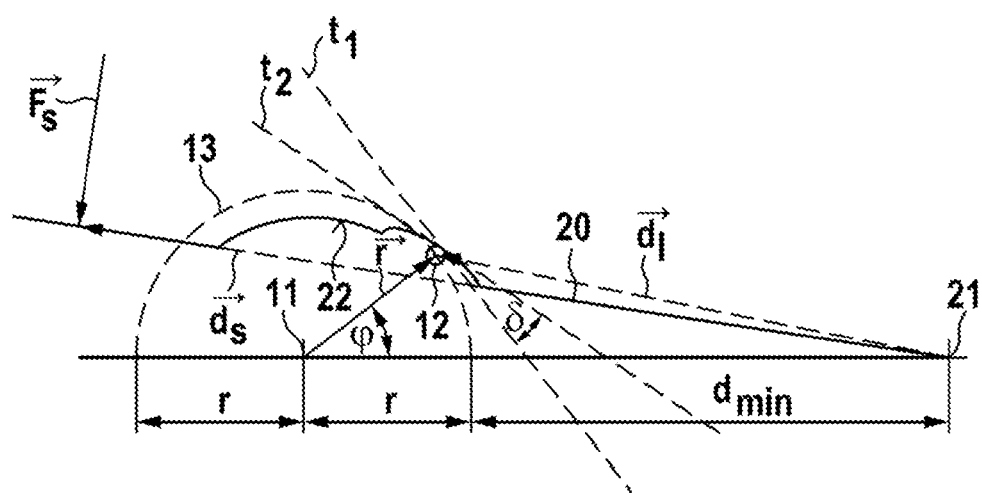
FIG. 2 shows a simplified representation of the lever mechanism of FIG. 1.

To simplify an understanding of the clutch actuation mechanism, FIG. 2 shows a simplified picture of a similar clutch actuation mechanism making use of the same principle. A lever 20 with a first lever arm $\vec{d}_S$ is forced by a spring force $\vec{F}S$ against a pin 12, being rotatable relative to a rotary axis 11. The pin 12 may thus travel along a circular path 13. The vector $\vec{\tau}$ indicates the lever arm of the pin 12. The vector $\vec{\tau}$ thus rotates around the rotary axis 11 and forms an angle φ with a ray from the rotary axis 11 through the pivot axis 21 ($\vec{\tau}(\varphi=0)$). As can be seen, the pin 12 travels over the contacting surface 22 when the disc 10 and thus the vector $\vec{\tau}$ rotates. Thus, the lever arm is a function of the angle φ, the length τ of the vector $\vec{\tau}$ and the distance between the pin 12 at φ=0 and the pivot axis 21. Said distance is referred to as $d_{min}$. When the pin 12 travels over the contacting surface 22, the angle between the normal of the contacting surface at the position where the pin 12 contacts the contacting surface and the normal of the circular path 13 at the corresponding position of the pin 12 varies as a function of φ. This angle can be reflected by the angle δ of the tangents $t_1$ and $t_2$, wherein $t_1$ is the tangent of the contacting surface 22 at the position of the pin 12, and $t_2$ the tangent of the circular path 13 at the pin's 12 corresponding position. It is thus possible, to compensate the torque $M_C$ provided via the clutch operator 3 to the disc 10 by adjusting the angle δ of the lever as function of φ, $d_{min}$, r and $\vec{F}_S$, wherein $\vec{F}_S = \vec{F}_0 + \vec{k} \cdot \Delta l$. $\vec{F}_0$ is the force of the spring 4 at an initial length $l_0$, $\vec{k}$ the spring constant and Δl a change in length of the spring 4 relative to $l_0$. A compensation of the torque $\vec{M}_C$ can be obtained by setting δ:

$$\delta = \operatorname{Arcsin}\left(\frac{-M_C \sqrt{r^2 \sin^2(\varphi) + (d_{min} + r(1 - \cos(\varphi)))^2}}{r(F_0 + k \cdot \Delta l) d_S}\right),$$

provided that $\vec{F}_S$ is essentially orthogonal to the lever arm $\vec{d}_S$. If the orthogonality is not provided this can be accounted for by selecting δ:

$$\delta = \operatorname{Arcsin}\left(\frac{-M_C \sqrt{r^2 \sin^2(\varphi) + (d_{min} + r(1 - \cos(\varphi)))^2}}{r(F_0 + k \cdot \Delta l) \cdot d_S \cdot \sin(\gamma)}\right),$$

wherein γ is the angle between $\vec{F}_S$ and $\vec{d}_S$.

The above formulas can be understood easily starting from the demand that the additional torque $M_I$ provided via the lever 20 to disc 10 compensates for the torque $M_C$, i.e. $M_I = -M_C$. $M_I$ equals the torque $M_S$ provided by spring 4, i.e. $M_I = M_S$. This enables to calculate the force $F_I$ provided by the lever at the contacting point via the contacting surface 22 to the pin 12:

$$F_I = \frac{F_S \cdot d_S \sin(\gamma)}{d_l}.$$

$d_l$ can be expressed as a function of φ, as $$d_l = (r^2 \sin^2(\varphi) + (d_{min} + r(1 - \cos(\varphi)))^2)^{\frac{1}{2}}.$$

As the torque $M_I$ is given as $M_I = F_I r \sin(\delta)$, $-M_C$ reads:

$$-M_C = \sin(\delta) \frac{r \cdot F_S \cdot d_S \sin(\gamma)}{d_l},$$

the equation can be solved as:

$$\delta = \operatorname{Arcsin}\left(\frac{-M_C \cdot d_l}{r \cdot F_S \cdot d_S \sin(\gamma)}\right)$$

Expressing $d_l$ as function of φ and $F_S$ as a function of Δl yields:

$$\delta = \operatorname{Arcsin}\left(\frac{-M_C \sqrt{r^2 \sin^2(\varphi) + (d_{min} + r(1 - \cos(\varphi)))^2}}{r(F_0 + k \cdot \Delta l) \cdot d_S \cdot \sin(\gamma)}\right)$$

Figure 3:
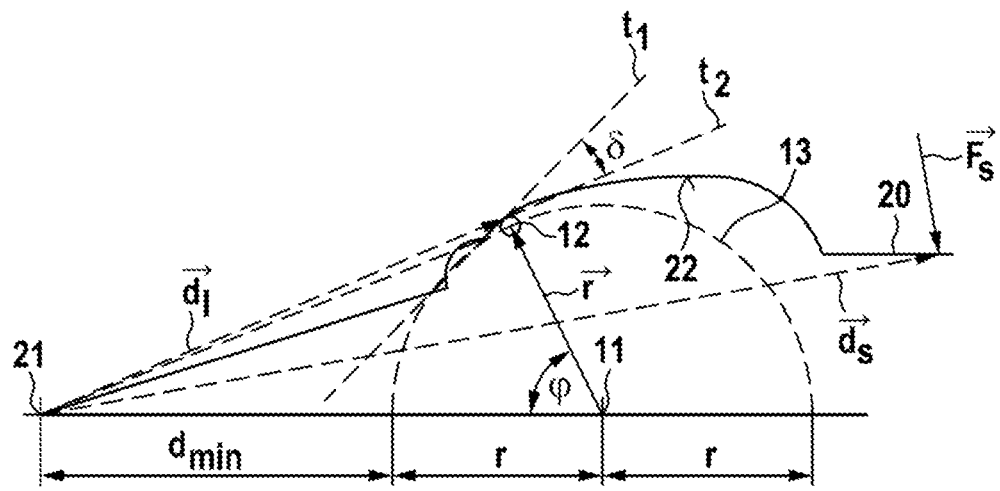
FIG. 3 shows a simplified representation of further lever mechanism.

The description of FIG. 2 can be read equally with respect to FIG. 3, but the angles φ δ have been selected differently. Further the curvature of the lever arm is different to account for a different torque $\vec{M}_C$ to be compensated.

Figure 4:
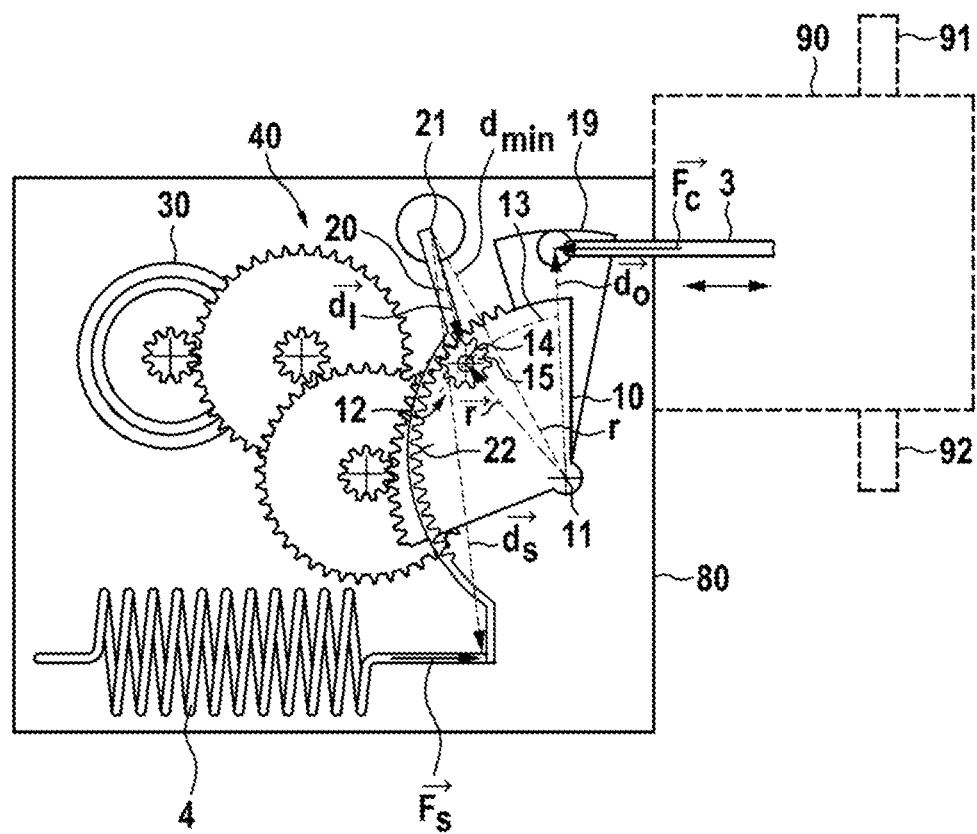
FIG. 4 shows a further example of a clutch actuation mechanism.

FIG. 4 shows a clutch actuating mechanism. The mechanism is similar to the mechanism as shown in FIG. 1 and generally the description of FIG. 1 can be read on FIG. 4 as well. The difference is that the pin 12 comprises a core 14 being attached to the disc 10. The core rotatably supports a toothed ring 15, i.e. a gear wheel 15. In turn the lever 20 is a toothed rack and the gear wheel 15 is geared with the lever 20. This gearing ensures that the ring 15 rotates on the core 14 and friction and wear is reduced when the pin travels over the lever's contacting surface 22. The core 14 and the ring 15 provide plain bearing surfaces, but other bearings can be used as well. Beyond the description of FIG. 1 can be read on FIG. 4 as well.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A clutch actuation mechanism for actuating a clutch operator of a spring loaded friction clutch, the clutch actuation mechanism comprising:
   at least one rotary disc connectable to the clutch operator, the at least one rotary disc being supported by a radial bearing defining a disc rotary axis of the at least one rotary disc and being coupled to a motor to provide a first torque to the at least one rotary disc;
   a pin attached to the at least one rotary disc with an offset from the disc rotary axis;
   a lever having a contacting surface and being pivotally supported to pivot around a lever pivot axis, wherein the lever pivot axis and the disc rotary axis are substantially parallel; and
   a spring that forces the contacting surface of the lever against the pin to thereby provide an additional torque to the at least one rotary disc,
   wherein the pin travels over the contacting surface when the at least one rotary disc rotates to open or close the spring loaded friction clutch via the clutch operator,
   wherein an entirety of the contacting surface over which the pin travels is curved.

2. The clutch actuation mechanism of claim 1, wherein the pin contacts the contacting surface at a first position, said first position defining a first tangent of the contacting surface, wherein the path of the pin when rotating the at least one rotary disc defines a second tangent at said first position, wherein said first and second tangents intersect at an angle δ, wherein the contacting surface is curved to provide an angle δ with $$\delta = \operatorname{Arcsin}\left(\frac{-M_C \sqrt{r^2 \sin^2(\varphi) + (d_{min} + r(1 - \cos(\varphi)))^2}}{r(F_0 + k \cdot \Delta l) d_S}\right) \pm \Delta \delta,$$

wherein $M_C$ is a torque required to compensate a force of a clutch spring, φ is the angle between a radial direction ($\vec{r}$) pointing from the disc rotary axis to a center of the pin and a ray starting at the disc rotary axis through the lever pivot axis and, $d_{min}$ is a minimum distance between the center of the pin and the lever pivot axis, $F_0$ is a force provided by the spring with at a length $l_0$ to the lever at a distance $d_S$ from the lever pivot axis, k is the spring's constant and $\Delta l$ is a deflection of the spring relative to $l_0$, where it is assumed that $\vec{F}_0$ and $\vec{k}$ are substantially orthogonal to $\vec{d}_S$ and $\Delta\delta \leq 10°$.

3. The clutch actuation mechanism of claim 2, wherein:

$$\delta = \text{Arcsin}\left(\frac{-M_C\sqrt{r^2\sin^2(\varphi) + (d_{min} + r(1-\cos(\varphi)))^2}}{r(F_0 + k \cdot \Delta l) \cdot d_S \cdot \sin(\gamma)}\right) \pm \Delta\delta,$$

wherein $\gamma$ is the angle between the $\vec{F}_0$ and $\vec{k}$ with $\vec{d}_S$, and wherein a restriction of orthogonality between $\vec{F}_0$, $\vec{k}$ and $\vec{d}_S$ is omitted.

4. The clutch actuation mechanism of claim 1, wherein the pin is rotatably supported by the at least one rotary disc.

5. The clutch actuation mechanism of claim 1, further comprising a support structure supporting the radial bearing of the at least one rotary disc and a pivotable support mechanism of the lever and the motor.

6. The clutch actuation mechanism of claim 1, wherein the motor is an electro motor being coupled to the at least one rotary disc via a reduction gear.

7. The clutch actuation mechanism of claim 2, wherein the contacting surface has at least a first segment, and wherein the angle $\delta$ is substantially zero.

8. The clutch actuation mechanism of claim 7, wherein the first segment contacts the pin when $M_C < M_{min}$, wherein $M_{min}$ is smaller than 10% of a maximum torque required to compensate the force of the clutch spring when opening or closing the spring loaded friction clutch.

9. The clutch operating mechanism of claim 1, wherein the at least one rotary disc is a disc segment or a shaft.

10. The clutch operating mechanism of claim 1, wherein the pin is rotatably supported relative to the at least one rotary disc.

11. The clutch operating mechanism of claim 1, wherein the pin comprises a core attached to the at least one rotary disc, wherein the core supports a radial bearing, and wherein the radial bearing comprises or supports a ring or a ring segment that is in contact with the contacting surface of the lever.

12. A clutch actuation mechanism for actuating a clutch operator of a spring loaded friction clutch, the clutch actuation mechanism comprising:
at least one rotary disc connectable to the clutch operator, the at least one rotary disc being supported by a radial bearing defining a disc rotary axis of the at least one rotary disc and being coupled to a motor to provide a first torque to the at least one rotary disc;
a pin attached to the at least one rotary disc with an offset from the disc rotary axis;
a lever having a contacting surface and being pivotally supported to pivot around a lever pivot axis, wherein the lever pivot axis and the disc rotary axis are substantially parallel; and
a spring that forces the contacting surface of the lever against the pin to thereby provide an additional torque to the at least one rotary disc,
wherein the pin travels over the contacting surface when the at least one rotary disc rotates to open or close the spring loaded friction clutch via the clutch operator, and
wherein the contacting surface of the lever has a number of adjacent first protrusions with first recesses in between, wherein the pin has a number of adjacent second protrusions with second recesses in between, and wherein at least one of the first protrusions engages into at least one of the second recesses and at least one of the second protrusions engages into at least one the first recesses.

13. The clutch operating mechanism of claim 12, wherein a radial bearing supports a ring having the second protrusions and the second recesses.

14. A clutch actuation mechanism for actuating a clutch operator of a spring loaded friction clutch, the clutch actuation mechanism comprising:
at least one rotary disc connectable to the clutch operator, the at least one rotary disc being supported by a radial bearing defining a disc rotary axis of the at least one rotary disc and being coupled to a motor to provide a first torque to the at least one rotary disc;
a pin attached to the at least one rotary disc with an offset from the disc rotary axis;
a lever having a contacting surface and being pivotally supported to pivot around a lever pivot axis, wherein the lever pivot axis and the disc rotary axis are substantially parallel; and
a spring that forces the contacting surface of the lever against the pin to thereby provide an additional torque to the at least one rotary disc,
wherein the pin travels over the contacting surface when the at least one rotary disc rotates to open or close the spring loaded friction clutch via the clutch operator, and
wherein the pin comprises a gear wheel being rotatably supported relative to the at least one rotary disc by at least one radial bearing, and wherein the lever is a teethed rack, which teethed rack gears with the gear wheel.

* * * * *